3,213,050
PROCESS FOR POLYMERIZATION OF
HALOGENATED NITROSOALKANES
David E. Rice, Minneapolis, Minn., assignor to Minnesota Mining and Manufacturing Company, St. Paul, Minn., a corporation of Delaware
No Drawing. Filed Mar. 27, 1961, Ser. No. 98,342
17 Claims. (Cl. 260—29.6)

This invention relates to a new and useful process for the polymerization of halogenated nitrosoalkanes. In one aspect, this invention relates to the production of new high molecular weight copolymers of halogenated nitrosoalkanes.

The polymerization of halogenated nitrosoalkanes with other monomers to produce polymeric products has been suggested. The copolymerization of such monomer has been carried out in a bulk-type system or in organic solutions. Due to the difficulty of heat control in these systems, the production of very high molecular weight polymers has been difficult. In the bulk-type system in which there is no diluent medium present, maintaining the temperature substantially constant is especially difficult. When using an organic solution in which the copolymer is soluble, temperature control is enhanced by the dilution effect. As the copolymer is produced the viscosity of the solution increases, thus hampering heat exchange. It is, therefore, an object of this invention to overcome the above disadvantages of the prior process in the copolymerization of halogenated nitrosoalkanes and also to produce higher molecular weight material not having heretofore been obtainable.

It is an object of this invention to provide a new process for close temperature control during the copolymerization of halogenated nitrosoalkanes.

It is another object of this invention to produce higher molecular weight copolymers of halogenated nitrosoalkanes than heretofore have been produced.

Another object of this invention is to provide a mobile reaction mixture of a halogenated nitrosoalkane which is easily handled in large reaction equipment.

Various other objects and advantages of the present invention will become apparent to those skilled in the art from the accompanying description and disclosure.

According to the present invention, a halogen-containing nitrosoalkane is copolymerized with one or more unsaturated comonomers while the monomers are liquid and dispersed as a suspension in an aqueous medium to produce high molecular weight solid copolymers. The copolymerization reaction is carried out at low temperatures, usually below 0° C. Therefore, it is usually necessary to include in the aqueous medium a freezing point depressant. In addition, since it is necessary to suspend the monomers as fine liquid droplets in the aqueous medium, agitation and a solid inorganic dispersing agent are utilized to maintain the liquid monomers dispersed in globular form. Agitation may be effected by mechanical stirring or by shaking the reaction vessel. The monomers are maintained as liquids under polymerization conditions by utilizing a sufficiently high pressure upon the system. The process may conveniently be carried out under autogenous conditions.

Best results are obtained at about −20° C. or below. The freezing point depressant of the aqueous medium must be inorganic and must effectively lower the freezing point of the aqueous medium to the above temperature conditions. Organic freezing point depressants are not satisfactory because they tend to act as chain transfer agents and as a result lower the molecular weight of the product. The preferred freezing point depressants are the inorganic metal salts which are soluble in water, such as lithium bromide, lithium chloride and zinc nitrate. Preferably, the freezing point depressants give an acid pH or neutral pH to the system. The preferred pH of the aqueous medium is usually between about 5 and about 8. Basic systems adversely effect the polymerization. Aside from the above metal and alkaline earth metal salts as freezing point depressants, various inorganic acids may be utilized, such as sulfuric acid, depending upon the dispersing agent used.

The suspending agents utilized to help maintain the liquid monomers in finely divided globular form as a discontinuous liquid phase in the aqueous medium are the water and monomer insoluble inorganic solids in finely divided form of not greater than about 100 microns in average diameter. These inorganic solids include various oxides, hydroxides and other salts of metals, including alkaline earth metals and silicon. Any solid material which is dispersable in the aqueous phase and which is of sufficiently finely divided form is useful as an aid in dispersing the monomers during agitation of the aqueous medium. These dispersing agents must be insoluble in both the monomers and the aqueous medium. Usually the concentration of dispersing agent based upon the aqueous medium including the freezing point depressant is between about 0.1 and about 10 weight percent. Minimum amounts of dispersing agent are preferred.

The final suspension which is easily removed from the reactor settles out upon cessation of stirring. However, it can be redispersed easily, by agitation. The mixture of polymer and suspending agent can be separated by filtration or decantation and most of the suspending agent removed by addition of mineral acid which reacts with most of the suspending agents. Addition of acid causes rapid coagulation of the polymer and may result in the incorporation of small amounts of suspending agent with the polymer. Complete removal can be obtained by solvent extraction. Suitable dispersing agents include magnesium carbonate, calcium phosphate, titanium dioxide, zinc oxide, silica, aluminum hydroxide, magnesium oxide and barium sulfate. Magnesium carbonate is the type of dispersing agent that can be conveniently removed by acidifying the aqueous medium after the polymerization is terminated.

No catalyst is necessary for the polymerization reaction to proceed. The aqueous medium including the freezing point depressant is considered the continuous phase of the process and the liquid monomers are considered the discontinuous phase.

The weight ratio of monomers to aqueous medium is usually between 1:1 and about 1:10; preferably an excess of aqueous phase is utilized.

The solid copolymers of the present invention have average molecular weights above 50,000 and generally above 500,000, and as high as 1,000,000 or higher. The copolymers prepared in accordance with the present invention are either thermoplastic or elastomeric depending upon the conditions of polymerization and the monomers employed. Many of the elastomeric and thermoplastic copolymers are insoluble in hydrocarbon solvents. Many of the copolymers of this invention are thermally stable up to about 200° C. The proportion of the monomeric units in the final copolymer varies between about 5 and about 95 mol percent for each of the components. Usually the copolymer is a 1:1 copolymer.

Preferably, the halogen-containing nitrosoalkane monomeric material of a present invention is one in which the halogens are normally gaseous halogens and preferably the nitrosoalkane contains less than 13 carbon atoms per molecule and is a mononitrosoalkane although dinitrosoalkanes and nitronitrosoalkanes are included within the scope of the term "nitrosoalkane." Nitrosoalkanes of greater number of carbon atoms can be made and used as monomers without departing from the scope of this invention. Typical examples of the halogen-containing nitrosoalkanes which can be copolymerized in accordance with the present invention include trifluoronitrosomethane, 2-hydroperfluoronitrosoethane, pentafluoronitrosoethane, tetrafluorodinitrosoethane, tetrafluoronitronitrosoethane, trifluorochlorodinitrosoethane,
heptafluoronitrosopropane, hexafluorodinitrosopropane, hexafluoronitronitrosopropane, mononitrosoperfluorobutane,
octafluorodinitrosobutane, mononitrosoperfluorooctane, trifluorodichloronitrosoethane, 1-nitroso-1,3,5,7,7,7-hexachlorononafluoroheptane, and 1-nitroso - 1,3,5,7,9,9,9,-heptachlorododecafluorononane.

The mononitrosoalkanes are typically prepared by reacting a halogen-containing alkyl halide of less than 13 carbon atoms, such as an alkyl bromide or an alkyl iodide, with nitric oxide in approximately equal molar ratios in the presence of mercury and ultraviolet light for about 24 hours at ambient temperature to produce the corresponding mononitrosoalkane. The use of the bromide is preferred because it is much cheaper than the iodide. For example, trifluoromethylbromide or iodide is reacted with nitric oxide to produce trifluoronitrosomethane; pentafluoroethylbromide or iodide is reacted with nitric oxide to produce pentafluoronitrosoethane; and heptafluoropropylbromide or iodide is reacted with nitric oxide to produce heptafluoronitrosopropane. Also, the chlorofluoronitrosoalkanes can be prepared from chlorotrifluoroethylene telomers of trichlorobromomethane in a similar manner.

A convenient empirical formula for representing the mononitroso compounds is $R_f$—NO where $R_f$ is an alkyl radical containing fluorine on the carbon atom adjacent to the nitroso group and in which the other halogens are selected from the group consisting of chlorine and fluorine. Preferably, the alkyl radical is perhalogenated and has not more than 6 carbon atoms. More preferably, the alkyl radical is perfluorinated.

The dinitroso and nitronitroso alkanes may be prepared by reacting nitric oxide with a fluorine-containing olefin to produce a compound containing a carbon chain of at least two carbon atoms having an oxide of nitrogen group attached to each of two adjacent carbon atoms in said chain in which at least one of said oxide of nitrogen groups is a nitroso group. Preferably, the olefin has at least one halogen atom attached to at least one of the carbon atoms of the double bond and therefore the resultant adduct also contains at least one halogen atom on at least one of the carbon atoms of the former double bond. The reaction between the nitric oxide and the olefin is carried out in either the liquid or vapor phase within a wide range of conditions. The temperature of reaction is usually between about 10° C. and about 100° C. Preferably, the reaction is carried out at ambient temperature conditions. In some cases, an energy source, such as infrared light or ultraviolet light, can be employed. Under such conditions, the reaction is carried out generally in the vapor phase but sufficient pressure may be utilized to cause either or both of the reactants to be present in the reaction zone in the liquid phase without departing from the scope of this invention. The reaction time is usually between about one-half hour and about 30 hours. Preferably, the reaction is carried out with an excess of olefin being present at the reaction site. The total charge of reactants is a mol ratio of nitric oxide to olefin of approximately 2:1.

In some instances, mixtures of nitroso and nitro compounds may be produced, which mixtures can be separated into their separate components by fractional distillation or by other conventional methods. With most olefins and under the preferred reaction conditions primarily the nitronitroso adducts are obtained.

The olefin employed in the preparation of the dinitroso or nitronitroso alkanes is preferably an acyclic monoolefin-1 containing not more than 12 carbon atoms per molecule, generally not more than 6 carbon atoms, and preferably contains at least one halogen atom attached to at least one of the carbon atoms of the double bond. Preferably, these halogens are normally gaseous halogens. The resulting adducts are the 1,2-nitronitrosoalkanes and 1,2-dinitrosoalkanes, such as 1,2-nitronitrosotetrafluoroethane and 1,2-dinitrosotrifluorochloroethane. The preferred class of olefins is the perhalogenated olefins in which at least one fluorine atom is attached to each of the carbon atoms of the double bond. Examples of perhalogenated olefins are tetrafluoroethylene, trifluorochloroethylene, perfluoropropene, and perfluorobutene-1, unsymmetrical difluorodichloroethylene, 2 - chloropentafluoropropene-1, and 1,1 - dichlorotetrafluoropropene-1. Other olefins which may be employed are those which are only partially halogenated, such as vinylidene fluoride, difluoromonochloroethylene, 1,1-chlorofluoroethylene, trifluoroethylene, 1,1-dihydroperfluoropropene-1, and 1,1-dihydroperfluorobutene-1.

The comonomers with which the nitrosoalkanes of the present invention are copolymerized are the polymerizable unsaturated organic compounds, preferably having ethylenic unsaturation and not more than about 10 carbon atoms per molecule. More preferably, these are halogen-containing acyclic olefins having at least two fluorine atoms per molecule, and any other halogens are gaseous halogens. Both unsubstituted and substituted unsaturated organic compounds may be employed as a comonomer without departing from the scope of this invention. Examples of substituted unsaturated organic compounds which are useful as a comonomer are the monoolefins containing at least one fluorine atom on at least one carbon atom of the double bond, such as vinylidene fluoride, trifluoroethylene, difluoromonochloroethylene, tetrafluoroethylene, trifluorochloroethylene, unsymmetrical difluorodichloroethylene, and perfluoropropene; the fluorine-containing diolefins, such as 1,1-difluorobutadiene-1,3, 1,1,2-trifluorobutadiene-1,3, 1,1,3-trifluorobutadiene-1,3, 1,1-difluoro-2-methylbutadiene-1,3, 1,1-difluoro-3-methylbutadiene-1,3, 1,1-difluoro-2-trifluoromethylbutadiene-1,3, and 1,1,2,4,4-pentafluorobutadiene; and fluorine-containing vinyl ethers, such as 2,2,2-trifluoroethylvinyl ether, methyltrifluorovinyl ether and γ-trifluoromethoxytetrafluoropropylvinyl ether ($CF_3OC_2F_4CH_2OCH=CH_2$); and the fluorine-containing esters, such as the acrylate ester of 1,1-dihydroheptafluorobutanol, methacrylate ester of n-ethylperfluorooctane sulfonamido ethanol, and acrylate ester of n-propylperfluorooctane sulfonamido ethanol. Non-halogenated substituted comonomers which may be used are propyl vinyl ether, acrylonitrile and styrene. An example of a non-substituted olefinically unsaturated comonomer is butadiene. In addition to copolymerization of a nitrosoalkane with only one of the above comonomers, two or more of any combination of the above monomers may be copolymerized with a nitrosoalkane.

In accordance with this invention, the copolymerization is carried out in an aqueous liquid phase in which the monomers are dispersed as liquid droplets at temperatures between about −50 and about 0° C., preferably between about −35 and about −20° C. for a period of time of at least one-half hour without a catalyst or promoter to obtain up to 90 percent conversion to the solid polymer. The charge may utilize an excess of either the nitroso-containing monomer or the olefin, but preferably a 1:1 mol ratio is used.

One of the advantages of the suspension polymerization process of this invention is the fact that the temperature of copolymerization can be maintained substantially constant at the desired value thus narrowing the molecular weight distribution of the product insofar as this varies with the temperature fluctuation arising from the heat of polymerization. For example, in bulk polymerization the heat of polymerization causes in some cases an abrupt temperature rise of 40° C. or higher at the outset the polymerization. The use of the present process effectively minimizes this temperature surge to not more than about 10° C.

The advantages in the use of the suspension polymerization technique manifest themselves particularly when the process is scaled up. In bulk or solution polymerization, the reaction mixture solidifies or becomes very viscous; thus, it cannot be stirred nor readily removed from the reaction vessel. Furthermore, in cases in which a sizeable heat of reaction is evolved, this heat is very difficultly removed from a viscous reaction mixture. This situation becomes progressively aggravated as the size of the reaction is increased.

The present copolymerization of the nitrosoalkane with an olefin proceeds through a free radical mechanism. Numerous experiments have demonstrated that the copolymerization proceeds by this mechanism. For example, using conventional chain transfer agents in the copolymerization results in a substantial decrease in molecular weight of the product. In other experiments, cationic catalysts were used, such as $TiCl_4$ and $BF_3$ etherate which are known to inhibit anionic reactions. These did not have any effect upon the molecular weight; this therefore, would rule out an anionic reaction mechanism. Since the system works well with perhalogenated monomers, the cationic-type mechanism would also appear to be impossible. Any ionic-type polymerization mechanism is known to be inhibited by aqueous systems, and since the present reaction can be effected readily in an aqueous system, it is clear that the type of reaction involved is a free redical mechanism even though no catalyst or promoter is utilized in the polymerization process.

For the above reasons, it is essential in the present system to provide pure and clean monomer in order to produce a solid high molecular weight copolymer of the present invention. The mononitrosoalkane monomers are made from materials which act as free radical transfer agents; for example, trifluoromethyliodide and trifluoromethylbromide. These compounds are noted as very active free radical chain transfer agents. Therefore, only by special care in purifying such monomers derived from these precursor materials and only by the use of inorganic insoluble dispersing agents it is possible to produce the high molecular weight polymer having an essentially linear structure. In general, the monomers should contain less than one weight percent of any impurities, such as trifluoromethylbromide, and preferably less than 0.5 weight percent impurities, particularly when the impurity is trifluoromethyliodide. If the impurity content of the monomers exceeds the above values, the polymer molecular weight is substantially below 50,000, usually around 7,000 to 15,000 molecular weight.

In order to obtain such a purified monomer of the nitrosoalkane, a packed distillation column of at least 70 theoretical plates should be used. For example, the use of a distillation column of 50 or less theoretical plates and of inefficient construction results in an impurity content as high as 20 weight percent.

The 1:1 copolymer of the mononitrosoalkane has a linear-type structure which has been substantiated by chemical anaylsis and nuclear magnetic resonance determination.

The solid high molecular weight polymers, both thermoplastic and elastomeric, of the present invention are useful as sealants, adhesives and surface coatings such as for metal and glass surfaces. The solid rubbery or elastomeric copolymers of this invention may be preformed at temperatures above 150° C. into various articles, such as gasket and O-rings, and vulcanized or cross-linked to produce stiffer and harder articles.

The following examples are offered as a better understanding of the various aspects of this invention including the preparation of monomers and copolymers and should not be construed as limiting the invention.

EXAMPLE I

A 50/50 mol ratio charge of $CF_3Br$ (74.5 grams) and NO (15.0 grams) was agitated in the presence of mercury and ultraviolet light (2537 A.) for 24 hours. The pressure was maintaind at about one atmosphere by intermittently charging NO as the pressure decreased. The product was distilled in a 35 inch long reflux column having about 70 theoretical plates using aluminum turnings as packages and at a reflux temperature of about —84° C. to produce a 60 percent yield of trifluoronitrosomethane substantially free from $CF_3Br$ (less than one weight percent).

EXAMPLE II

About 60 cc. of LiBr solution (53 grams LiBr/100 cc. $H_2O$), 2.0 grams $MgCO_3$ and 8 grams each $CF_3NO$ and $C_2F_4$ were charged into a 150 cc. stainless steel cylinder. The cylinder was shaken for 20 hours in a bath maintained at —25° C. At the end of this time, the cylinder was vented and the contents poured out. The suspension of $MgCO_3$ and polymer particles was allowed to settle and the supernatant liquid decanted. The suspension was then washed four times by stirring with water, allowing to settle and decanting the supernatant liquid. Concentrated HCl was then added to the suspension until no further reaction could be observed. The polymer, which coagulated upon addition of the acid, was washed with water and dried under vacuum. The copolymer product (11.8 grams had an inherent viscosity in $(C_4F_9)_3N$ of 0.95. Comparable bulk or solution polymerizations result in $<n>$ values of 0.7–0.8.

EXAMPLE III

About 60 cc. of LiBr solution (53 grams LiBr/100 cc. $H_2O$), 5.0 grams $MgCO_3$, 10.2 grams of $O_2NCF_2CF_2NO$, and 5.8 grams of $C_2F_4$ were charged into a 150 cc. stainless steel cylinder. The cylinder was shaken for 20 hours in a bath maintained at —25° C. At the end of this time, the cylinder was vented and the contents poured out. The suspension of $MgCO_3$ and polymer particles was allowed to settle and the supernatant liquid decanted. The suspension was then washed four times by stirring with water, allowing to settle and decanting the supernatant liquid. Concentrated HCl was then added to the suspension until no further reaction could be observed. The polymer, which coagulated upon addition of the acid, was washed with water and dried under vacuum. The copolymer product (12.7 grams) was a high molecular weight solid elastomer.

EXAMPLE IV

About 60 cc. of LiBr solution (53 grams LiBr/100 cc. $H_2O$), 5.0 grams $MgCO_3$, 9 grams of $ClCF_2CF_2NO$, and 6.0 grams of $C_2F_4$ were charged into a 150 cc. stainless steel cylinder. The cylinder was shaken for 20 hours in a bath maintained at —25° C. At the end of this time, the cylinder was vented and the contents poured out. The suspension of $MgCO_3$ and polymer particles was allowed to settle and the supernatant liquid decanted. The suspension was then washed four times by stirring with water, allowing to settle and decanting the supernatant liquid. Concentrated HCl was then added to the suspension until no further reaction could be observed. The polymer, which coagulated upon addition of the acid, was washed with water and dried under vacuum. The copolymer product (12.0 grams) was a high molecular weight solid elastomer.

EXAMPLE V

Several runs were made on the copolymerization of $CF_3NO$ and $C_2F_4$ in a manner substantially the same as described in Example II. In these runs, conditions of operation as well as dispersing agent and freezing point depressants were varied from run to run. Table I below shows the conditions of operation and the results of such runs.

Table I

| Run | Suspending or emulsifying medium | Total monomer charge (g.) 1:1 MR | Temp. | Conversion (percent) | Product |
|---|---|---|---|---|---|
| 1 | 12 cc. LiCl sol'n. (F.P. −50°), 1.0 g., $MgCO_3$ | 4.2 | −25° | 64 | High molecular weight solid. |
| 2 | 12 cc. LiBr sol'n., 1.0 g. $MgCO_3$ | 4.2 | −25° | 67 | Do. |
| 3 | 60 cc. LiCl sol'n., 5.3 g. $MgCO_3$ | 16 | −25° | 63 | Do. |
| 4 | 60 cc. LiBr sol'n., 5.3 g. $MgCO_3$ | 16 | −25° | 63 | Do. |
| 5 | 60 cc. LiBr sol'n., 2.0 g. $MgCO_3$ | 16 | −25° | 74 | Do. |
| 6 | 10 cc. LiBr sol'n., .33 g. $MgCO_3$ | 3.1 | 0° | 50 | No suspension. |
| 7 | 10 cc. LiBr sol'n., .50 g. $MgCO_3$ | 3.1 | 0° | 55 | High molecular weight solid. |
| 8 | 10 cc. LiBr sol'n., 0.9 g. ZnO | 3.1 | 0° | 50 | Do. |
| 9 | 10 cc. LiBr sol'n., 0.9 g. $TiO_2$ | 3.1 | 0° | 50 | Do. |
| 10 | 10 cc. LiBr sol'n., 0.9 g. $BaSO_4$ 0.02 g. $MgCO_3$ | 3.1 | 0° | 50 | Do. |
| 11 | 10 cc. LiBr sol'n., 0.9 g. $Ca_3(PO_4)_2$ | 3.1 | 0° | 63 | Do. |
| 12 | 10 cc. LiBr sol'n., 0.9 g. MgO, 0.01 g. $MgCO_3$ | 3.1 | 0° | 50 | Do. |
| 13 | 10 cc. $Zn(NO_3)_2$ sol'n. (F.P. −20°), 0.9 g. $MgCO_3$ | 4.2 | 0° | 54 | Do. |
| 14 | 10 cc. 50% glycerol sol'n., 0.9 g. $MgCO_3$ | 4.2 | 0° | 60 | Low molecular weight. |
| 15 | 10 cc. $H_2O$, 0.2 g. $C_8F_{17}SO_2NHC_3H_6N(CH_3)_3Cl$ | 4.2 | 0° | 24 | Low molecular weight, no suspension. |
| 16 | 10 cc. $H_2O$, 0.4 g. Cl $(CF_2CFCl)_3CO_2H$, KOH to pH 12 | 4.2 | 0° | 15 | Low molecular weight. |

Runs 15 and 16 show the adverse effect of alkaline conditions and organic dispersing agents. Run 14 shows the adverse effect of organic freezing point depressants. The other runs show variations in temperature, concentration and components of the system.

Various temperature and pressure conditions and other polymerization variables may be utilized in the practice of this invention without departing from the scope thereof.

Having described my invention, I claim:

1. A polymerization process which comprises copolymerizing a halogen-containing nitrosoalkane with another polymerizable ethylenically unsaturated monomer dispersed in an aqueous medium with a water and monomer insoluble inorganic dispersing agent in finely divided form at a temperature between about −50° C. and about 0° C. to produce a solid copolymer.

2. The process of claim 1 in which the weight ratio of monomers to aqueous medium is between about 1:1 and about 1:10.

3. The process of claim 1 in which said dispersing agent is magnesium carbonate.

4. The process of claim 1 in which said dispersing agent is zinc oxide.

5. The process of claim 1 in which said dispersing agent is titanium dioxide.

6. The process of claim 1 in which said dispersing agent is barium sulfate.

7. The process of claim 1 in which said dispersing agent is calcium phosphate.

8. The process of claim 1 in which said nitrosoalkane is a mononitrosoalkane.

9. The process of claim 8 in which the mononitrosoalkane is trifluoronitrosomethane.

10. The process of claim 1 in which said aqueous medium contains an inorganic water soluble freezing point depressant.

11. The process of claim 10 in which the freezing point depressant is lithium bromide.

12. The process of claim 10 in which the freezing point depressant is lithium chloride.

13. The process of claim 10 in which the freezing point depressant is zinc nitrate.

14. An aqueous dispersion containing a fluorine-containing nitrosoalkane and another ethylenically unsaturated monomer copolymerizable with said nitrosoalkane and a water and monomer insoluble inorganic dispersing agent in finely divided form.

15. An aqueous dispersion containing a perfluoronitrosoalkane and another monomer containing ethylenic unsaturation and copolymerizable with said nitrosoalkane and a water and monomer insoluble inorganic dispersing agent in finely divided form.

16. An aqueous dispersion containing a copolymer of a fluorine-containing nitrosoalkane and an ethylenically unsaturated monomer and a water and monomer insoluble inorganic dispersing agent in finely divided form.

17. An aqueous dispersion containing a copolymer of a perfluoronitrosoalkane and a fluorine-containing ethylenically unsaturated monomer and a water and monomer insoluble inorganic dispersing agent in finely divided form.

References Cited by the Examiner

FOREIGN PATENTS 643,045  9/50  Great Britain.
789,254  1/58  Great Britain.

OTHER REFERENCES

Mason et al.: "Technology of Plastics and Resins" (1945), D. Van Nostrand Co., New York, p. 34.

MURRAY TILLMAN, Primary Examiner.

LEON J. BERCOVITZ, Examiner.